United States Patent [19]  
Nichols

[11] Patent Number: 4,537,785  
[45] Date of Patent: Aug. 27, 1985

[54] PROCESS FOR PRODUCING PRESERVED FISH FOOD AND FISH FOOD PRODUCED

[76] Inventor: Ralph A. Nichols, 21 Elm Way, Kerrville, Tex. 78028

[21] Appl. No.: 488,582

[22] Filed: Apr. 25, 1983

[51] Int. Cl.³ .................................................. A23L 3/34
[52] U.S. Cl. ..................... 426/332; 426/335; 426/532; 426/643; 426/805
[58] Field of Search .............. 426/332, 335, 532, 643

[56] References Cited

U.S. PATENT DOCUMENTS

| | | |
|---|---|---|
| 3,361,566 | 1/1968 | Axelrod . |
| 3,623,893 | 11/1971 | Mauge ............................. 426/332 X |
| 3,634,104 | 1/1972 | Kaplow et al. .................. 426/332 X |
| 3,692,545 | 9/1972 | Moore ..................................... 426/2 |
| 3,806,615 | 4/1974 | Frankenfeld et al. .......... 426/332 X |
| 3,852,483 | 12/1974 | Oborsh et al. . |
| 3,904,774 | 9/1975 | Dymsza ......................... 426/426 X |
| 4,055,676 | 10/1977 | Foulkes . |
| 4,160,847 | 7/1979 | Orth, Jr. ......................... 426/643 X |
| 4,191,783 | 3/1980 | Burkwall et al. . |
| 4,212,894 | 7/1980 | Franzen et al. . |

Primary Examiner—Robert Yoncoskie  
Attorney, Agent, or Firm—Harold H. Dutton, Jr.

[57] ABSTRACT

A process for producing a preserved fish food from live fish food wherein the live fish food such as brine shrimp, tubifex worms, earthworms, plankton and the like are placed in an anhydrous liquid desiccant such as propylene glycol and allowed to stand for a sufficient period of time to dehydrate the live fish food to an equilibrium level, and after removing the supernatant liquid, a preservative liquid may be added to the preserved fish food to produce a storage stable, preserved fish food, and the products produced by the process.

11 Claims, No Drawings

4,537,785

PROCESS FOR PRODUCING PRESERVED FISH FOOD AND FISH FOOD PRODUCED

This invention relates to a process for producing a preserved fish food from fresh or live fish food. More particularly, the invention relates to a process for producing a preserved food for tropical fish mariculture fish and goldfish from a live, natural food of such fish without destroying the natural appeal and nutritional value of the fresh or live fish food.

BACKGROUND OF THE INVENTION

A large number of different types of foods are fed to fish such as goldfish, mariculture fish or tropical fish both in a natural environment and a controlled environment such as in aquariums or special tanks or ponds. Usually, the most preferred fish foods are the naturally occuring water animals such as Daphnia pulex, Artemia salinas (brine shrimp), mosquito larvae, Tubifex worms and Cyclops. Such natural foods are best for optimum fish growth and condition, and in some species of fish are even essential for breeding.

However, these natural foods are usually quite expensive to obtain, may have a short lifetime, and are difficult to keep. In addition, introduction of these types of foods carries a hazard of potentially introducing water borne diseases into the aquarium. The availability of this type of food is largely seasonal, and these foods may not even be available during the winter season.

As a result, many types of processed or prepared fish foods have been introduced commercially, including both preserved natural foods or specially prepared foods.

One type of processed fish food is the baked and ground cake type foods. Such foods are among the oldest and most common types of fish foods, and are frequently used for commercial fish raising of many types and species, including trout, catfish, tropical fish, goldfish and shrimp.

Such cake type fish foods are inexpensive and easy to store. However this type of food tends to foul the water, and usually does not produce good color on ornamental fish. Often, this type of food will not bring fish of any type to a breeding condition.

Flaked foods are another type of fish food which are much easier to produce in high quality than the baked and ground cake type, as the processing does not heat the food to the high temperatures of baking, nor is the cooking period as long. This type product has better vitamin content than the baked food and is more palatable to the fish, since baking destroys the "raw taste" which fish seem to prefer.

However, flaked foods require much higher processing costs and high energy consumption for production, resulting in significantly higher product cost compared to the baked products. Furthermore, due to the finer milling requirements in preparation, the flaked products are quite bulky and hard to store in flake form, as the flakes damage to powder very easily.

An advance over the handling of live foods is achieved through the freezing of such live foods. Such frozen products are easier to handle than live foods, but still are very energy intensive in production operations. High energy costs are needed to process the food by the manufacturer, and such costs continue for the transportation and the storage of such products. Thawing of the product at any stage prior to use will destroy any such products in minutes. Moreover, some frozen foods such as fish and shrimp lose useful food values within a few months due to freezing, as enzyme action causes deterioration by reducing the protein and vitamin content.

An advance over freezing of such foods has taken place through the development of freeze drying techniques. Freeze dried products are much easier to handle and store, and these products do not deteriorate as fast as frozen fish food. Indeed, freeze dried products may be stored for years without appreciable deterioration. However, freeze drying, like freezing, is very energy intensive, and thus quite expensive for commercial production of fish food. The high cost of freeze drying often prevents the use of this technique for commercial operations.

The oldest type of preservation of fish food is by air drying of the food. Such preservation requires almost no machinery or energy at any stage of the processing. However, the commercial viability of such a process and product is quite poor, since the air drying reduces the food value by causing rancidity of the fat in the process. Almost all palatability, vitamin content, color, odor, freshness and live texture is lost in such processing, and the resulting fish food is poorly accepted by all fish.

A need, therefore, exists for a fish food product which is acceptable and nutritional to fish, which is of low manufacturing and processing costs, which may be stored for extended periods of time without deterioration, and which may be easily packaged and handled.

OBJECTS OF THE INVENTION

Accordingly the primary object of this invention is to provide an improved process for producing a preserved fish food.

Another object of this invention is to provide an improved proved process for producing a preserved fish food from live or fresh natural fish food.

Still another object of this invention is to provide an improved process for producing preserved fish food which overcomes the disadvantages of prior art processes.

Yet another object of the present invention is to provide an improved process for producing preserved fish food which is nutritional, storage stable, easily handled, and palatable to fish.

Still a further object of this invention is to provide a low cost process for producing preserved, natural fish food.

Yet a further object of this invention is to provide a natural fish food product of good storage stability, high nutritional value, and ready acceptability to fish.

These and other objects and advantages of this invention will become apparent when considered in light of the following description of the invention.

DESCRIPTION OF THE INVENTION

According to the process of this invention, the live or fresh natural fish foods are subjected to the action of a liquid desiccant which dehydrates or draws the water out of the animals. Simultaneously, some of the lipid content of the animals is removed. The resultant dehydrated food material is stored in an anhydrous preservative liquid at a rather high solids content, so that the product has a rather pasty consistency.

When the product is added to water, such as aquarium water, it is readily reconstituted.

The live or fresh fish foods which may be preserved according to the present invention include most of the commercially and nutritionally significant, natural fish foods, including both aquatic life such as brine shrimp, tubifex worms plankton and the like, as well as earth worms. It is essential that the fish foods be alive or fresh when to the processing of this invention. The preserved foods, when reconstituted, cannot be readily distinguished from the live food by appearance, color, texture or form, and fish acceptance of the product is extraordinarily high, with some "problem" eaters accepting this food when no other available food was accepted.

The fish acceptance of the fish food according to the present invention seems to be as high as the live animal food with the exception of interest caused by movement of the live food which of course is not possible with the preserved food.

One of the more significant types of fish food which may be produced according to the present invention is preserved brine shrimp. Brine shrimp are extremely fragile when live, and begin to spoil within just five minutes after death at 60° F. In addition, brine shrimp, which are a favorite food of many species of fish, may only be obtained in certain bodies of water and only during certains times of the year. As a result, brine shrimp have been heretofore rather expensive when available.

Yet brine shrimp may be easily processed by the process of this invention and the processed brine shrimp are storage stable for extended periods of time with no deterioration in quality or acceptability. When produced according to the preferred embodiment, the brine shrimp have a consistency similar to catsup, are readily reconstituted, and are eagerly accepted by fish.

The process of the invention requires draining off of any water on the live or fresh food and gently mixing the live or fresh food with an anhydrous liquid desiccant. The mixture is allowed to stand for a period of time sufficient to reach equilibrium between the fish food and the desiccant so that as much water is removed from the fish food by the desiccant as possible. In the case of brine shrimp in anhydrous propylene glycol as the desiccant, approximately 12 hours is needed to reach equilibrium, while for earthworms in propylene glycol, approximately 24 hours standing time is necessary. In addition, some of the lipid content of the animal is also removed by the desiccant, and this factor seems to be responsible, at least in part, for the preservation of the animal.

With most of the water, and some of the lipids, removed, the animal tissues are prevented from enzymic and bacterial decay, and this stops all life processes of the animals and bacteria.

After the mixture reaches equilibrium, the supernatant liquid is drained off, and a preservative liquid may be added to the product in sufficient quantity to assure preservation and still maintain ease of handling. In some cases, a mold inhibitor may be added, as otherwise mold may form on the pro- duct.

The desiccants which may be used according to this invention include liquids which are hygroscopic and non-toxic. The desiccants which have been found to adequately meet these criteria are propylene glycol, 1,3-butanediol, glycerine and ethyl alcohol. However, glycerine tends to produce a very hard product which is almost brittle, and ethyl aocohol tends to absorb moisture from the atmosphere. Thus, propylene glycol the preferred disiccant.

The most favorable desiccant liquid is anyhdrous propylene glycol which is non-toxic and produces a high quality product with good stability and good acceptability to the fish.

The desiccant liquid is preferably mixed with the drained live animals at a ratio of about 50/50 by weight. While as little as 17% of the desiccant may be used, if too little of the desiccant is used, the dehydration may be incomplete and spoilage will result in the entire batch. While an excess of the desiccant is preferred, such excess is provided by the 50/50 ratio, and a greater amount of desiccant is usually not necessary. Although the precise amount of desiccant is not critical, the dehydration of the animal is, and if spoilage results, the quantity of desiccant used should be increased.

The preservative liquid which may be used according to the invention are anhydrous propylene glycol and anhydrous which exhibits good preservation ability for the fish food and are non-toxic. Again, anhydrous propylene glycol is the most preferred preserving liquid.

Any readily available food grade, non-toxic mold inhibitors may be used with the product, but calcium propionate has been found to be particularly suitable, especially with brine shrimp. The calcium propionate is added to the product at a concentration of about 0.1% by weight based on the weight of the preserved brine shrimp.

As a by-product of the process according to this invention, it has been found that the desiccant after draining from the fish food is a good attractant for such species as fish and insects such as bees, wasps and flies. The propylene glycol desiccant which has dissolved soluble fats from the animals being preserved, releases odors and taste attractants to air or water. Fly and wasp tests showed the extract was able to attract any insects normally attracted to the animals, live or dead.

EXAMPLE

In order to show the extent of dehydration and lipid extraction of fish food according to this invention, an experiment was conducted wherein 160 grams of live, drained brine shrimp and 160 grams of propylene glycol were introduced into a beaker and mixed carefully so as not to damage the brine shrimp. The mixture was allowed to stand in the beaker for 24 hours. Initially, the shrimp floated in the propylene glycol solution, but after a period of time, sufficient water loss occurred and the shrimp shrank in volume and sank to the bottom.

At the end of 24 hours, the supernatant liquid was drained from the shrimp. The liquid weighed 260 grams while the preserved shrimp remaining weighed 33 grams. (The missing weight of 27 grams was attributed to the amount wetting the netting used to drain the shrimp.)

The liquid containing the propylene glycol, water, and undetermined lipid content was then placed in a flat pan and allowed to stand in sunlight for a period of time, and then reweighed. The liquid then weighed 140 grams, indicating that 20 grams of propylene glycol remained in the shrimp or on the netting. For control purposes, a similar pan of pure propylene glycol was placed in sunlight for the same length of time, and no weight loss was determined, indicating that the propylene glycol had not evaporated as did the water content in the liquid.

Reconstitution of the brine shrimp was observed under a microscope, and took approximately 15 seconds. Slightly longer time was necessary in an aquarium. Similar processing of earthworms for 24 hours in propylene glycol at 50/50 ratio produced worms which took approximately 1 hour for reconstitution in 70° F. water. The difference in time is attributed to the greatly differing surface area of the two products, with the surface area of brine shrimp per gram being approximately 10,000 times the surface area of a gram of earthworm.

After the supernatant liquid is drained from the preserved fish food, a preservative liquid is preferably added. It has been found that the concentration of preservative liquid should be within the range of 10-20% by weight of the preserved fish food, and preferably about 10-17%. While the preserved fish food may be used without the preservative liquid, by adding the indicated amount of preservative liquid, the storage stability of the product is greatly enhanced. Less than 10% may cause occasional early spoilage, while excess liquid changes the consistency of the product to a more fluent state, making handling more difficult.

Thus, according to the preferred embodiment of the invention, approximately equal weights of drained brine shrimp and anhydrous propylene glycol are mixed and allowed to stand for about 12 hours to reach equilibrium, the point at which no more water may be removed by the propylene glycol. The liquid is then removed from the preserved shrimp, and about 10% by weight of the preserved shrimp of fresh propylene glycol preservative liquid is added, along with 0.1% by weight of calcium propionate.

The resulting product has a pasty consistency and a specific gravity greater than that of water.

The product has been tested on 50 types of tropical fish for acceptability and side effects. During this testing, the only negative finding was caused by the rapid drop of the product to the bottom when placed in the aquarium water. While this does not appear to be a major concern, it may be overcome by pre-hydrating the material by simply placing the fish food in water and allowing it to absorb water before adding it to the aquarium.

The product thus produced was found to provide excellent color and growth of the fish tested, and was able to be stored at room temperature for many months without degradation.

While this invention has been described as having preferred embodiments, it will be understood as being capable of further modification following the principles of the invention, and this application is intended to cover all variations and modifications of the invention which fall within the spirit of the invention and the scope of the claims.

What I claim is:

1. A process for producing a preserved fish food from live fish food material naturally sized for feeding to aquarium fish comprising providing a quantity of live fish food, draining any excess water from the live fish food, mixing the drained live fish food with 17-50% by weight of the fish food of substantially anhydrous liquid propylene glycol for dehydrating the live fish food, allowing the mixture to stand for a sufficient period of time to reach a substantially equilibrium concentration of water in said liquid, draining said liquid from the fish food, and adding approximately 10-20by weight based upon the weight of the fish food of anhydrous propylene glycol.

2. A process for producing a preserved fish food as in claim 1 and including adding to the preserved fish food a mold inhibitor.

3. A process for producing a preserved fish food as in claim 1 and including adding to the preserved fish food approximately 0.1% by weight of the preserved fish food of calcium propionate.

4. A process for producing a preserved fish food as in claim 1 and wherein said live fish food comprises live brine shrimp.

5. A process for producing a preserved fish food as in claim 4 and including adding to the preserved brine shrimp approximately 0.1% by weight of the preserved brine shrimp of a mold inhibitor.

6. A preserved fish food produced by the process of claim 1.

7. A process for producing preserved brine shrimp comprising providing a quantity of live brine shrimp in water, draining the water from the live brine shrimp, mixing the drained live brine shrimp with an approximately equal weight of substantially anhydrous propylene glycol, allowing said mixture to stand at room temperature for sufficient time to dehydrate the brine shrimp, removing the supernatant liquid from the brine shrimp, and adding to the brine shrimp approximately 10-17% by weight of the dehydrated brine shrimp of fresh substantially anhydrous propylene glycol preservative.

8. A process for producing preserved brine shrimp as in claim 7 and including adding a mold inhibitor to the preserved brine shrimp.

9. A process for producing preserved brine shrimp as in claim 7 and including adding approximately 0.1% by weight of the preserved brine shrimp of calcium propionate.

10. A process for producing preserved brine shrimp as in claim 7 and including allowing said mixture to stand for approximately 12 hours.

11. A preserved fish food produced by the process of claim 7.

* * * * *